(12) United States Patent
Lai

(10) Patent No.: US 10,704,759 B1
(45) Date of Patent: Jul. 7, 2020

(54) FOG LAMP APPARATUS

(71) Applicant: Ching-Tsung Lai, Tainan (TW)

(72) Inventor: Ching-Tsung Lai, Tainan (TW)

( * ) Notice: Subject to any disclaimer, the term of this patent is extended or adjusted under 35 U.S.C. 154(b) by 0 days.

(21) Appl. No.: 16/742,817

(22) Filed: Jan. 14, 2020

(51) Int. Cl.
| | | |
|---|---|---|
| *F21V 7/04* | (2006.01) | |
| *F21S 41/47* | (2018.01) | |
| *B60Q 1/20* | (2006.01) | |
| *F21S 41/143* | (2018.01) | |
| *F21S 45/47* | (2018.01) | |
| *F21S 41/19* | (2018.01) | |
| *F21W 102/10* | (2018.01) | |
| *F21W 102/30* | (2018.01) | |

(52) U.S. Cl.
CPC ............... *F21S 41/47* (2018.01); *B60Q 1/20* (2013.01); *F21S 41/143* (2018.01); *F21S 41/192* (2018.01); *F21S 45/47* (2018.01); *F21W 2102/10* (2018.01); *F21W 2102/30* (2018.01)

(58) Field of Classification Search
CPC .... B60Q 1/20; F21S 41/00–198; F21S 41/47; F21S 45/47
USPC ................................................. 362/543–549
See application file for complete search history.

(56) References Cited

U.S. PATENT DOCUMENTS

| | | |
|---|---|---|
| 9,664,353 B2 | 5/2017 | Maliar et al. |
| 10,214,135 B2 | 2/2019 | Debert et al. |
| 2017/0297479 A1 | 10/2017 | Debert et al. |
| 2017/0350567 A1 | 12/2017 | Shibata et al. |

*Primary Examiner* — Jason M Han
(74) *Attorney, Agent, or Firm* — Alexander Chen, Esq.

(57) ABSTRACT

The present invention is directed to a fog lamp apparatus comprising a substantially cylindrical housing that comprises at least one bracket, ridges and grooves, at least one inset, at least one pair of sockets on the housing's inside wall, and at least one access hole. The fog lamp apparatus further comprises an outer lens, and at least one slanted mask that comprises at least one clip and one hook. The outer lens is attached to the mask by the clip, and the hook deposits in the inset of the housing. The fog lamp further comprises at least one inner lens that comprises at least one hollow cylindrical leg and at least one hook, and the hollow cylindrical leg is threaded to receive a crew. The fog lamp further comprises at least one LED board that comprises a light source; at least one heat sink that comprises a pair of symmetrical cylindrical arms, and ridges and grooves that are counterparts of the ridges and grooves of the housing. The heat sink further comprises a socket on its outer back wall. The LED board and inner lens are attached to the heat sink. The cylindrical arms deposit in the pair of sockets of the housing. The screw of the inner lens fastens the inner lens to the heat sink. The fog lamp further comprises at least one PCB, at least one adjuster bolt assembly that comprises an adjuster bolt, an O-ring gasket, and a nut. The nut further comprises a protruding knob disposed on its outer wall. The protruding knob comprises a short cylindrical body and a larger ball head that engages the socket of the heat sink. The adjuster bolt is inserted through the access hole of the housing, and the adjuster bolt's head is accessible from outside the housing.

1 Claim, 9 Drawing Sheets

FOG LAMP APPARATUS

FIELD OF THE INVENTION

The present invention relates to a device for emitting a light beam and a light, especially for an automotive vehicle, comprising the device.

BACKGROUND

The current art teaches for assembling lights with a light beam that is bounded by a cut-off line at a certain level above ground level. This cut-off line is produced using either masks and/or reflectors.

While this creates a hard edge on the cast light, the light housing itself is then attached to often a very diverse number of different types of makes and models of vehicles.

Furthermore, because many of these vehicles are of the off-road and motorsport variety, these makes and models further even more as these types of vehicles are often modified by enthusiasts with a wide range of tire sizes, shocks, and suspensions, such that the height of the light itself must now be accounted for in order for it to remain useful to the driver of the vehicle it is attached to.

In order to ensure that the beam is neither too high nor too low, it is necessary to allow for the adjustment of the vertical position of the cut-off line on the cast light. To make this adjustment, current devices are used that incorporate masks or reflectors which are movable by design.

This being so, when incorporating hinged masks or reflectors which address adjustment of the light beam, current designs are now understood to also have certain drawbacks, notably that the current designs lack the stability to withstand the impact and vibrations that these off-road vehicles are reasonably likely to experience.

What is needed, therefore, is a device that overcomes one or more of the problems in the prior art and provides for an adjustable light which also meeting the impact and vibration resistance requirements most of these drivers would require.

SUMMARY OF THE INVENTION

The present invention relates to a light device, notably one intended for a motor vehicle. More particularly, the present invention relates to a specific type of road lighting device, notably a foglight.

The present invention is directed to a fog lamp apparatus comprising a substantially cylindrical housing that comprises at least one bracket, ridges and grooves, at least one inset, at least one pair of sockets on the housing's inside wall, and at least one access hole. The fog lamp apparatus further comprises an outer lens, and at least one slanted mask that comprises at least one clip and one hook. The outer lens is attached to the mask by the clip, and the hook deposits in the inset of the housing. The fog lamp further comprises at least one inner lens that comprises at least one hollow cylindrical leg and at least one hook, and the hollow cylindrical leg is threaded to receive a crew. The fog lamp further comprises at least one LED board that comprises a light source; at least one heat sink that comprises a pair of symmetrical cylindrical arms, and ridges and grooves that are counterparts of the ridges and grooves of the housing. The heat sink further comprises a socket on its outer back wall. The LED board and inner lens are attached to the heat sink. The cylindrical arms deposit in the pair of sockets of the housing. The screw of the inner lens fastens the inner lens to the heat sink. The fog lamp further comprises at least one PCB, at least one adjuster bolt assembly that comprises an adjuster bolt, an O-ring gasket, and a nut. The nut further comprises a protruding knob disposed on its outer wall. The protruding knob comprises a short cylindrical body and a larger ball head that engages the socket of the heat sink. The adjuster bolt is inserted through the access hole of the housing, and the adjuster bolt's head is accessible from outside the housing.

DETAILED DESCRIPTION OF THE DRAWINGS

Figure 1:
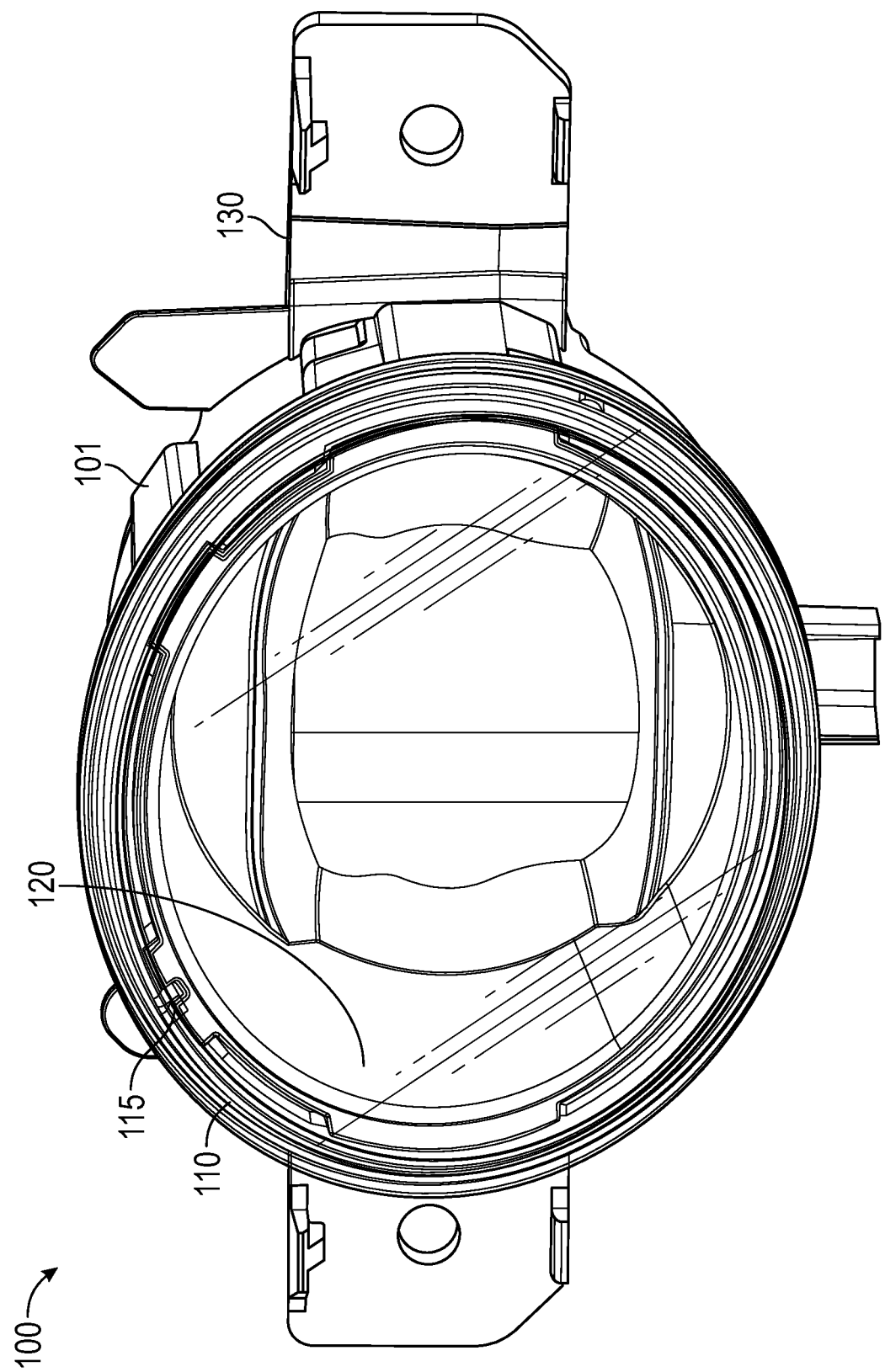
FIG. 1 is a perspective view of an embodiment of the current invention's lamp housing.

FIG. 1 illustrates an embodiment 100 of the current invention. This embodiment comprises an assembled housing 101 for a light emitting device (not shown) of an embodiment of the current invention. This embodiment comprises a convex front lens 110 that comprises at least one attachment clip 115 symmetrically disposed around the rim of the front lens 110. When assembled, the attachment clips 115 mate with counterparts on the rim of the housing 101. The housing 101 houses the emitting device which comprises, among other components, an inner lens, a LED board, a heat sink, a PCB, and an adjuster assembly (not shown). Optionally, the assembled housing 101 further comprises a style part or mask 120 disposed between the outer lens 110 and the inner lens, along the optical axis of the emitting device. The housing 101 further comprises a bracket 130 for attaching the housing to a vehicle's frame. The embodiment is intended to be installed to a vehicle and oriented along the Y-Y axis, or optical axis, of the vehicle.

Figure 2:
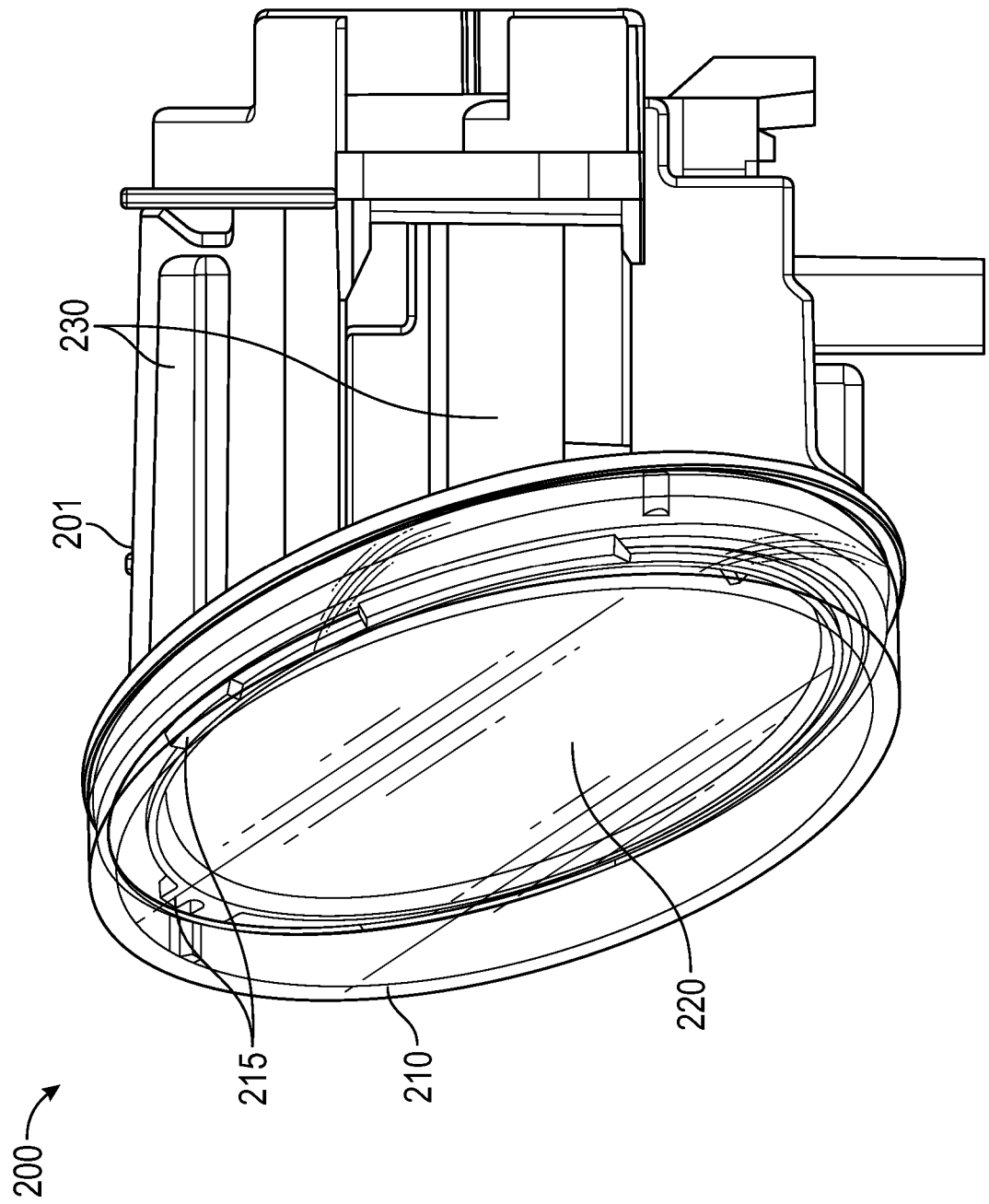
FIG. 2 is a left view of an embodiment of the current invention's lamp housing.

Referring to FIG. 2, another embodiment 200 of the current invention is shown comprising an assembled housing 201 which is illustrated with a slanted front comprising a outermost lens 210 that comprises at least one clip 215 to attach to the rim of the housing 201. The optional style part or mask 220 is also slanted and disposed between the outmost lens 210 and the inner lens (not shown), along the optical axis of the emitting device. The housing 201 further comprises ridges 230 on the outside, and grooves on the inside, running along the length of the housing. The grooves on the inside are to receive the ridges or protruding tabs disposed on the emitting device or heat sink, which are disclosed infra. The mating ridges and grooves lock on each other and prevent unwanted movement of the emitting device inside the housing.

Figure 3:
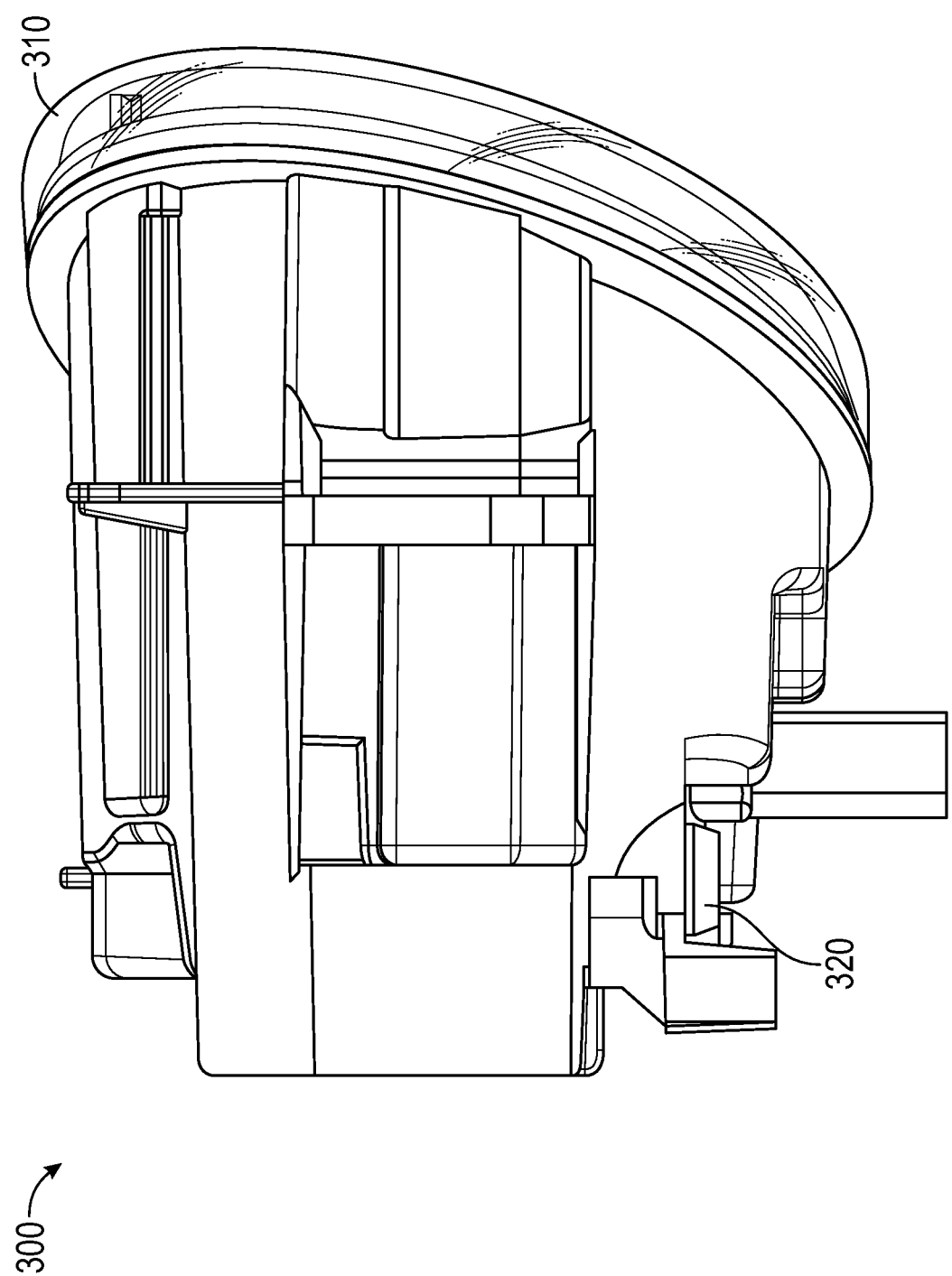
FIG. 3 is a right view of an embodiment of the current invention's lamp housing.

FIG. 3 illustrates another embodiment 300 of the current invention that comprises an assembled housing 301 that comprises an outmost lens 310 slanting away from view. The housing 301 comprises at least one additional opening that is an access hole 320 for the passage of an adjuster bolt (not shown; disclosed infra). The adjuster bolt can manipulate the emitting device to pivot about an axis without requiring the disassembly of the lighting unit itself.

Figure 4:
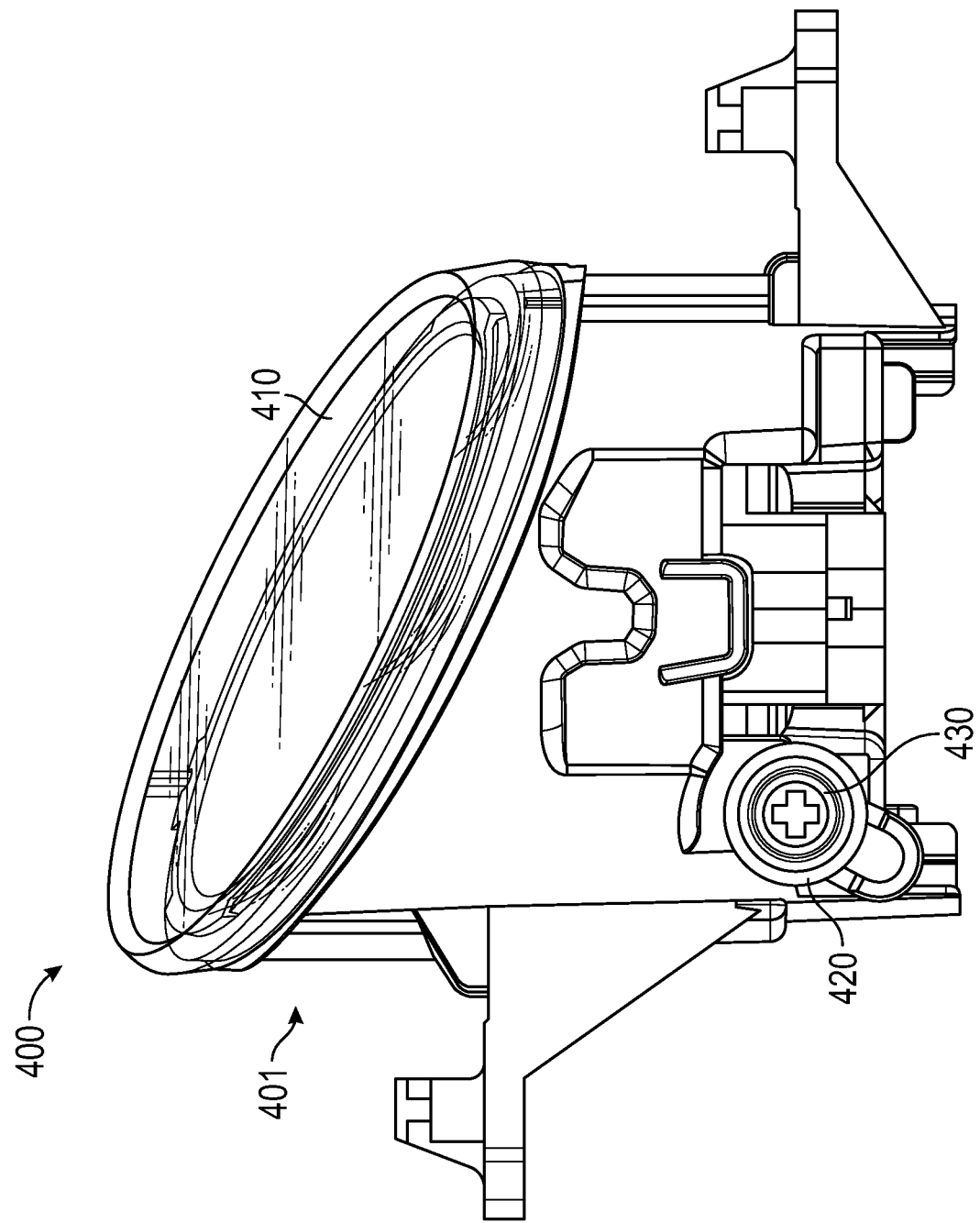
FIG. 4 is a bottom view of an embodiment of the current invention's lamp housing.

Referring to FIG. 4, another embodiment 400 of the current invention is shown comprising an assembled housing 401 that comprises a slanted front and a lens 410. This embodiment further comprises an access hole 320 that allows an adjuster bolt 430 through so that the adjuster bolt 430 can manipulate the emitting device to pivot about an axis. It is appreciated that more than one access holes and adjuster bolts are contemplated for different beam angles and/or functions of the emitting device.

As illustrated in FIGS. 1-4, an embodiment of the current invention comprises at least one lens and the means for producing a cut-off line in the beam. By this it will be understood that the device allows a light beam to be cast with an abrupt fall off at the edges bounded by a mask, or a light beam that at the very least exhibits a very rapid decrease in emitted luminosity below a certain level corresponding to the cut-off line, to be emitted. For the sake of simplicity, the beam may be considered to be limited under a plane, especially one intended to be substantially horizontal and to be located at a certain height above ground level.

Figure 5:
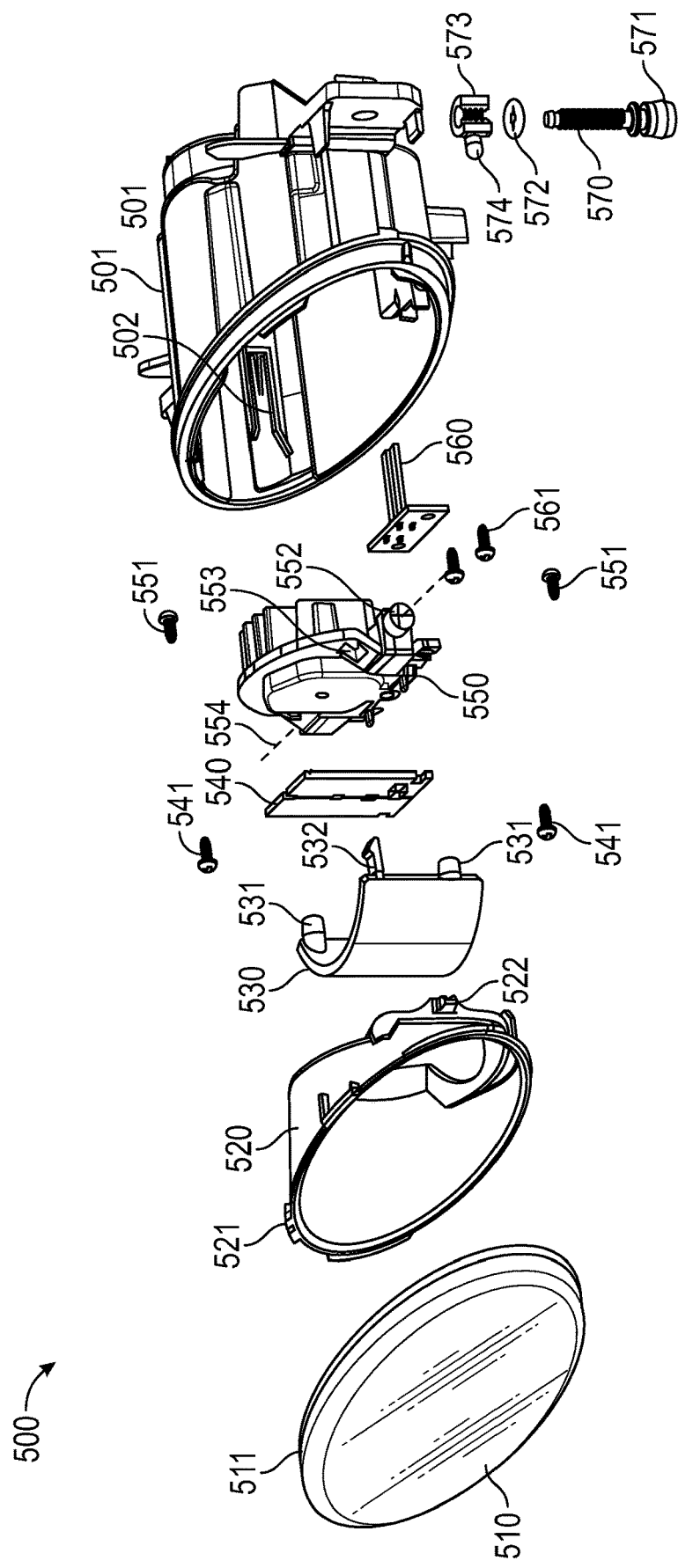
FIG. 5 is an exploded view of an embodiment of the current invention.

Referring to FIG. 5, an exploded view of an embodiment 500 of the current invention is shown. This embodiment 500 comprises an outmost lens 510 that comprises at least one clip 511 around the rim such that when assembled clip 511 latches on to its counterpart 521 of a mask or style part 520. It is also contemplated that the clip 511 can latch on a counterpart disposed on the housing 501. The mask 520 further comprises a clip 522 that is received by a groove 502 on the inside of the housing 501. The embodiment 500 further comprises an inner lens 530 that comprises cylindrical legs 531 and hooks 532 that are received by counterpart cavities 553 disposed on the face of a heat sink 550. The cylindrical legs 531 and hooks 532 are located on the adjacent four corners of the inner lens 530 and run parallel of the Y-Y axis. The cylindrical legs 531 are hollow and threaded to receive screws 551 when the inner lens 530 is attached to the heat sink 550. In this improved design, the inner lens is static and affixed onto the heat sink 550, anchored with these legs 531 and hooks 532 whereas in previously disclosed designs, the lens was moved and adjusted, and often held in front of the light source with either left and right supporting arms, or a single supporting arm. It is appreciated that such a design lacks stability and allows for the lens to bounce with the vehicle and, thus, the failure of the supporting arms under vibrations and force stress. When assembled, the legs 531 and hooks 532 are deposited into the cavities 553 in the heat sink 550 and the hooks 532 engage catches inside the cavities. It is contemplated that there are a variety of attachment methods that can be employed here.

Still referring to FIG. 5, the embodiment 500 further comprises a LED board 540 that is attached to the heat sink 550 by two screws 541. It is contemplated that heat that radiates from the LED board is dissipated by the heat sink. The heat sink 550 further comprises two arms 552 disposed symmetrically on the left and right sides. The two arms 552 are aligned and form a pivotal axis 554, perpendicular to the embodiment's optical axis or Y-Y axis. As the heat sink 550, and, thus, the attached LED board 540 and inner lens 530, can be caused to pivot about the pivotal axis 554, the lamp beam can be adjusted. The heat sink 550 further comprises cavities 553 to receive tabs 531 and hooks 532, as disclosed hereinabove.

Still referring to FIG. 5, the embodiment 500 further comprises a PCB 560 that controls the LED board 540. However, to protect the PCB 560 from the heat produced by the LED board 540, the PCB is attached to the inner surface of the housing 501. The specific LED board is, for example, an IMS board whereas the PCB is, for example, a FR4 board. The specific LED board is borne by the PCB. The PCB 560 is attached to the inner back of the housing 501 by the screws 561. It is contemplated that the heat sink, besides dissipating heat of the LED board and protecting the PCB 560 in the back, also serves as an electrical connector between the LED board 540 in the front and the PCB 560 in the back.

The embodiment 500 further comprises a housing 501 that houses most of the components disclosed above: the PCB 560, heat sink 550, LED board 540, inner lens 530, and mask or style part 520. The housing 501 takes the form of a substantially cylindrical shell for the lighting components. This is not a specific requirement, and the housing 501 and outer lens 510 may take other shapes which are chosen for either their own specific functions or for aesthetics. To receive and lock the components inside, the housing 501 comprises several grooves and ridges that engage to their counterparts on the heat sink 550 and the mask 520. Specifically, the housing 501 comprises a symmetrical pair of grooves 502 on the inside wall to receive and lock in the left and right arms 552 of the heat sink 550.

Still referring to FIG. 5, the embodiment 500 further comprises an adjuster bolt assembly 570 that comprises an adjuster bolt 571, an O-ring gasket 572, and a nut 573. To achieve the purpose of this invention, the adjustment of the cut-off line is carried out by actuating the adjuster bolt 571, which drives the attached nut 573 vertically up and down the length of the adjuster bolt. This nut 573 further comprises a protruding knob 574 disposed on and extending out from the outer wall of the nut. This protruding knob 574 has a short cylindrical body and a round ball head that engages with a receiving socket (not shown; disclosed infra) disposed on the back of the heat sink 550. The round head keeps the protruding knob 574 engaging the socket of the heat sink 550, but allows rotational movements of the heat sink. By rotating the adjustment bolt 571 clockwise or counterclockwise, the nut 573 will either ascend or descend, driven by the threading that follows the length of the adjuster bolt. As the nut 573 and its protruding knob are driven up or down, the engaged socket disposed on the heat sink 550 also moves up or down, and causes the heat sink 550 pivots around the rotational axis 554, effectuating the raising and lowering of the light beam cast by the device.

Figure 6:
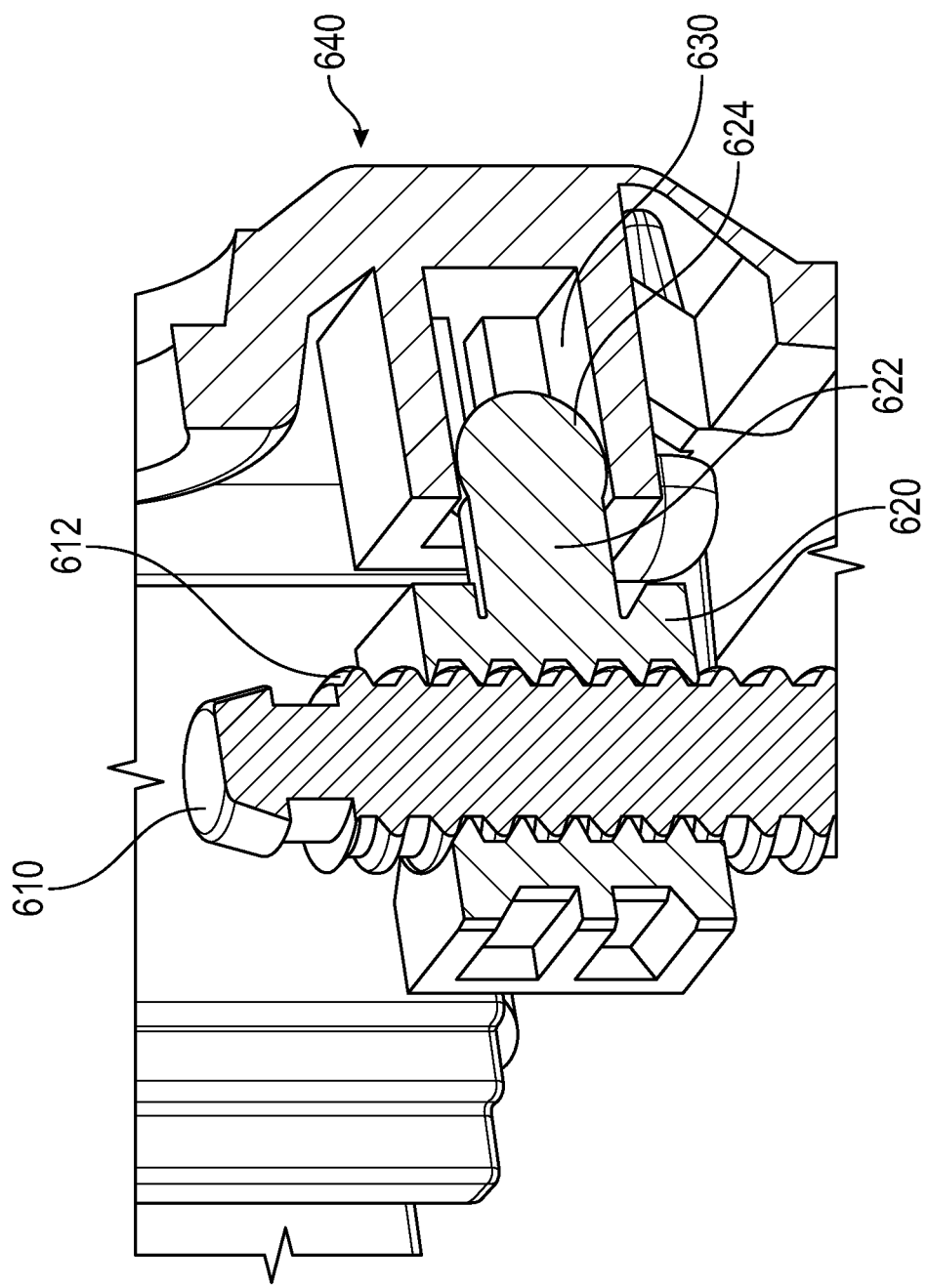
FIG. 6 is a cross-sectional view of an embodiment of the current invention's adjuster.

In further details, FIG. 6 illustrates a cross-sectional and exploded view of an exemplary adjustment mechanism of the current invention. FIG. 6 shows a bolt 610 with threads 612 that engage with counterpart threads of a nut 620 that comprises a protruding knob 622 that further comprises a ball head 624 that in turn engages a socket 630. As shown, the socket 630 is a part of and disposed on the back of a heat sink 640. As the bolt 610 turns, its threads 612 drive the nut 620 and its protruding knob 622 up and down. As disclosed hereinabove, the protruding knob 622's round head engages the socket 630, but is not affixed, so it allows the socket 630 turns and moves in an arc. Since the socket 630 is a part of the heat sink 640, its movement causes the heat sink pivots about the rotational axis which passes through the arms of the heat sink as disclosed above.

In one embodiment, the inner surface of the receiving socket 630 has a molded ridge such that once the ball head 624 deposits in the socket, the molded ridge prevents the ball head and nut 620 and the heat sink 640 from separating without a significant amount of force. This attachment method allows the adjuster assembly, comprising the adjuster bolt 610 and nut 620, and the heat sink 640 to have a slight amount of independent movement, and the linear force of up and down movement of the adjuster assembly be converted to an angular torque that pivots the heat sink. Furthermore, a ball and socket type connection can inherently mitigate some undesirable forces and in some ways as a shock absorber.

Furthermore, the adjuster assembly can be positioned on either side of the housing. In this way the lights themselves can be duplicated along the X-X axis for purposes of manufacturing such that the lighting unit can be installed either on the right-hand side or the left-hand side of a vehicle, maintaining the symmetrical placement of the adjuster bolt, and allows for the end user to quickly determine where the adjuster bolt is to be located on each light after the end user has been able to determine the location of the adjuster bolt on either of their installed lighting units. The adjuster bolt's threads are configured to allow the heat sink and, thus, the light emitting unit, to be rotated in an angular range, for example of +/−5°.

Figure 7:
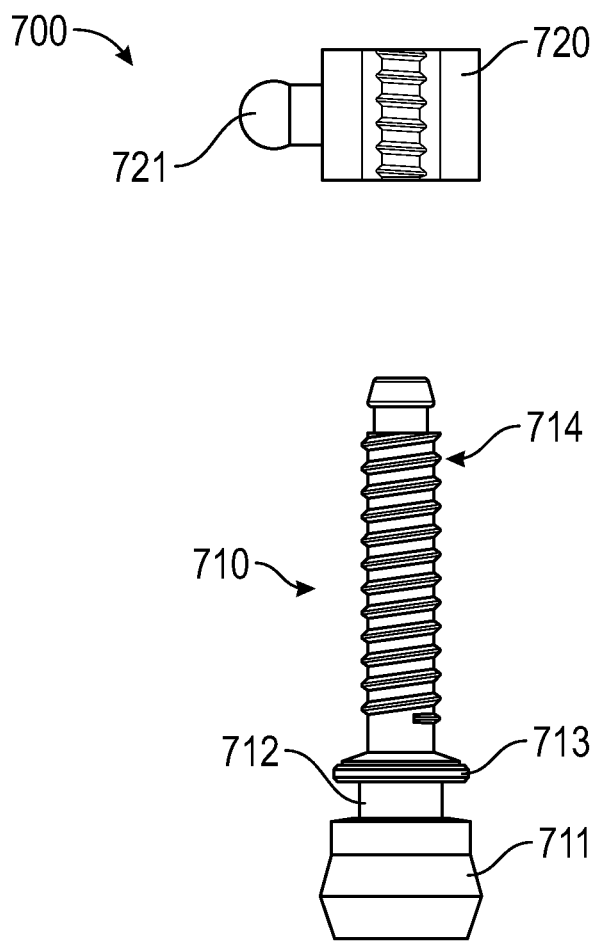
FIG. 7 is an exploded view of an embodiment of the current invention's adjuster bolt assembly.

FIG. 7 illustrates an exemplary adjuster bolt assembly 700 of the current invention. As shown, this assembly comprises an adjuster bolt 710 that is partially threaded and comprises header 711, an unthreaded segment 712, a flange nut 713, and a threaded segment 714. It is contemplated that one embodiments of the bolt 710 comprises a head cap 711 that can be screwed on the head-end of the bolt. This embodiment further comprises a molded flange 713. Another embodiment of the bolt 710 comprises a molded header 711 and a flange nut 713 that is screwed onto the adjusting bolt 710 until it reaches the unthreaded segment 712. Either of these embodiments will retain the adjusting bolt 710 at the access hole, but allow the adjuster bolt 710 to rotate. The adjuster bolt 710 cannot move along it longitudinal axis because the header 711's and the flange 713's diameters are larger than that of the access hole. However, the adjuster bolt 710 can rotate freely because the unthreaded segment 712's diameter is smaller than that of the access hole. The adjuster bolt assembly 700 further comprises a nut 720 that can engage the threaded segment 714. The nut 720 comprises a protruding knob 721 that comprises a short cylindrical body and a larger ball head. As disclosed hereinabove, the larger ball head engages a socket disposed on the back of a heat sink. As such, the adjuster bolt assembly 700 is attached to the heat sink, and can cause the heat sink, attached LED board, and attached lens to pivot.

Figure 8:
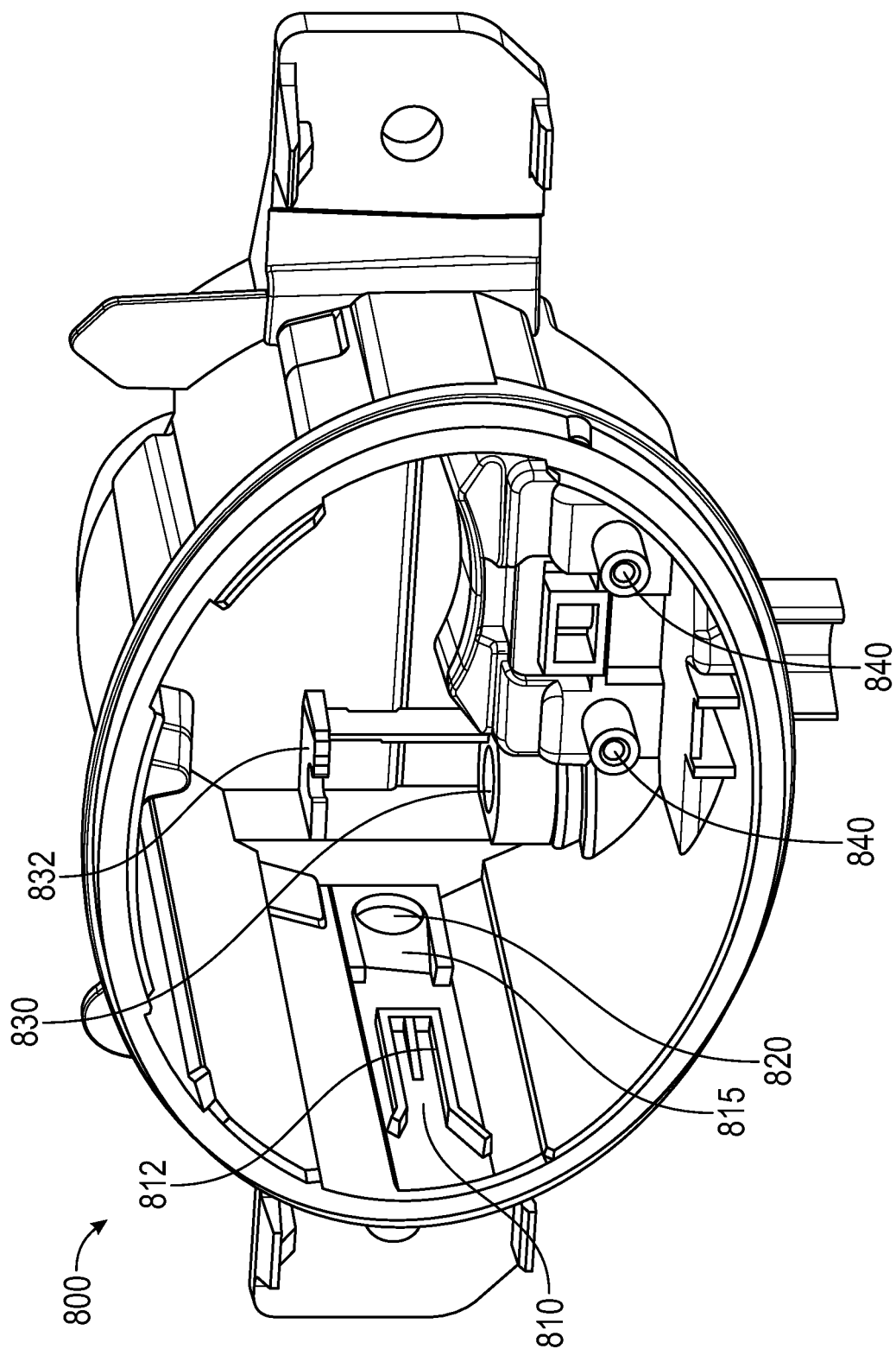
FIG. 8 is a perspective and detailed view of an embodiment of the current invention's lamp housing.

Referring to FIG. 8, an exemplary housing 800 is shown in more details comprising, among a variety of other ridges and grooves, a groove 810, a ramp 815 leading to a socket 820 disposed on the inner wall, towards the rear of the housing. There are also symmetrical groove, ramp, and socket on the opposite wall (not shown). When the light emitting unit, disclosed hereinabove, of the lamp is installed, the grooves 810 receive and guide the arms of the heat sink and the clip of the mask (disclosed in FIG. 5 and its description hereinabove). The ramps 815 are sloped up toward the sockets 820. As the arms of the heat sink approach the sockets 820, the housing 800 and the heat sink flex a bit because the up slopes of the ramps 815 squeeze the arms and heat sink. When the arms pass the rear edge of the ramps 815 and deposits in the sockets 820, the housing 800 and the heat sink return to their normal forms, and hold the arms inside the sockets 820, and, thus, the heat sink inside the housing 800 without the need for additional screws or other fastening means. With this fastening method, the current invention facilitates a tool-free installation of the heat sink and light emitting unit into the housing 800. Once sitting in the round sockets 820, the cylindrical arms allow for the heat sink to rotate about the rotational axis disclosed in FIG. 5 and its description. Furthermore, between sockets 820 and ramps 815, and grooves 810, housing 800 comprises a pair of insets 812 that apply the same or similar mechanical principles, receive and hold the clips of the mask, disclosed in FIG. 5 and its description, in a static position.

FIG. 8 further shows an access hole 830, mentioned in FIG. 7's description. Right above the access hole 830 is a half round rack 832 that receives the end of the hereinabove disclosed adjuster bolt, holds the bolt, but allows it to rotate in place. This housing 800 further comprises a pair of threaded sockets 840 that receive the screws which fasten the PCB, disclosed in FIG. 5 and its description, to the rear of the housing.

Figure 9:
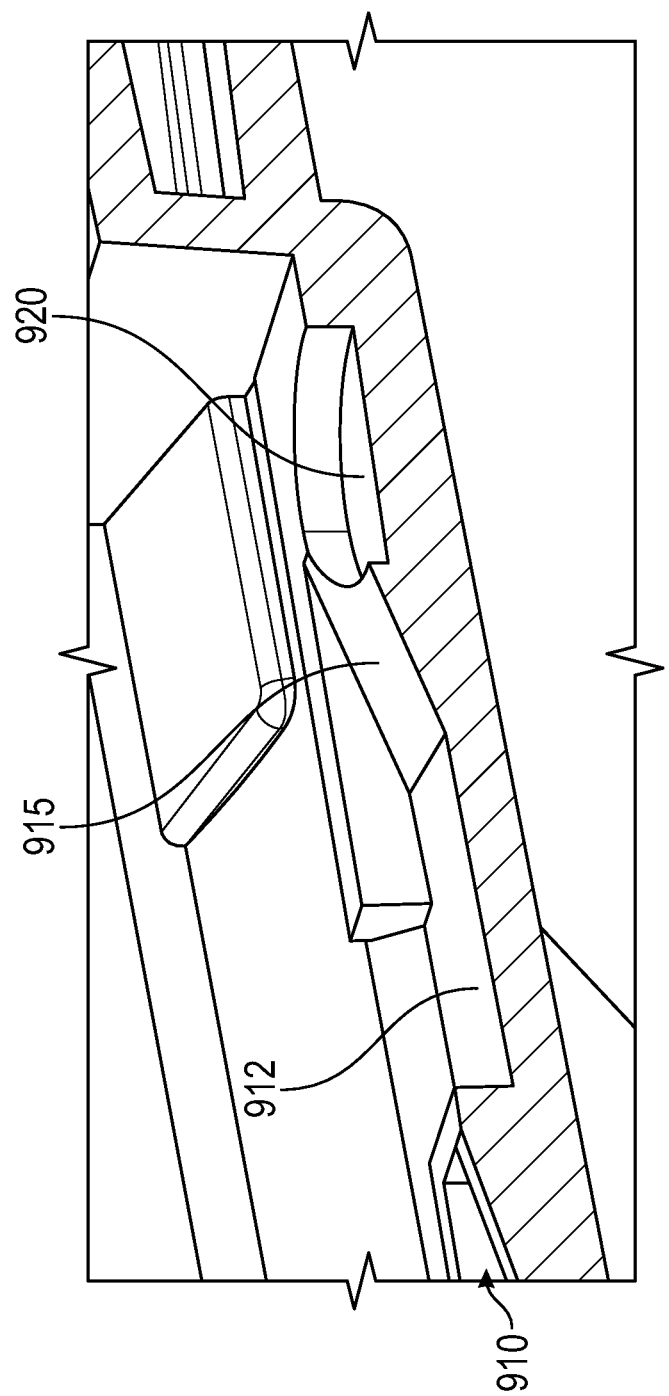
FIG. 9 is a cross-sectional view of an embodiment of the current invention's groove and socket.

In more details, FIG. 9 illustrates a cross-sectional view of the groove, inset, ramp, and socket, disclosed in FIG. 8 and its description. As the heat sink and light emitting unit is pushed in the housing, the arms of the heat sink enter the housing first. It is contemplated that the diameter of the arms is larger than the inset 910's so that the arms do not get caught in the insets 910. The clips of the mask enter the housing following the arms, and get caught in the insets 910. The arms of the heat sink continue on slide along the grooves 912, up the ramps 915, until they pass the rear edges of the ramps. They then deposit into the sockets 920. Once sitting inside the sockets 920, the arms are held there, cannot move linearly, but can rotate in place.

FIGS. 1-9 and their description have disclosed that the desired drop off or cutoff effect is created by simply casting light from the LED board having that light beam focused by the inner lens, and then having a predetermined drop-off effectuated by means of an opaque mask which then only allows for the desired lighting to pass on through the outermost lens. The inner lens will have a focal point at the light source or LED board. A beam is thus obtained the characteristics of which do not vary as a function of the angular position of the inner lens and which therefore do not depend on the position of the cut-off line. Rather, the inner lens and LED board affixed to the heat sink are pivoted with the heat sink about the heat sink's rotational axis.

In one embodiment, the beam cut-off to be adjusted in a vertical direction—other directions are also contemplated—depending on an angular position of the heat sink which pivots about the heat sink's rotational axis, which, as described hereinabove, passes through centers of the cylindrical arms which are symmetrically located on the left and right sides of the heat sink and can be molded to the heat sink.

The current invention differs substantially from the designs disclosed in prior arts whereby the light source would be fixed in a static position, additional lens(es) and masks are suspended in front of the static light source which would then be manipulated by independent hinge/rotation features to move lens or masks in front of the light source in order to achieve a cut-off line. As such, a light using the methods suggested in the prior art fail to account for the vibrational forces and how these forces are multiplied, particularly when a part is to be precariously extended via arm, joins or otherwise.

With the innovative improvements in FIGS. 1-9, the current invention eliminates the weakness of prior arts' extending forks or arms that comprise a ribbed end that engages with an adjuster screw's threads to pivot the lamps' lens and, thus, directs the lamp's light beam. It has been observed that the fork is a weak point in the prior arts' embodiments. The fork has been broken rather easily and the ribs have not engaged with the adjuster screw all the times. The current invention's ball and socket attachment eliminates the fork and ribs. The nut is secured to the adjuster bolt, and the heat sink's socket. Thus, there is no extension fork to be broken and unsecured moving parts to get loosen.

Furthermore, one of the main technical problems that the invention aims to resolve is the consolidation of the number of parts within the light unit required to adjust the beam cut-off. It has been observed that the more adjustments points, axes, or parts which are mounted downstream along numerous attachment and/or adjustment points, the more that these lamps are likely to fail and come out of alignment, particularly in light of the substantial impact forces and vibration that these lights are likely to encounter when vehicles are no longer in a static position. Thus, by allowing for the heat sink and light emitting unit to adjust while other parts mount on it, the potential for failure is significantly reduced.

Furthermore, a consumer themselves is more likely to understand the mechanical principles at work when they themselves wish to adjust the lights as an adjustment will more readily produce a 1:1 understanding. That is, when the adjuster bolt is turned clockwise, the light raises. It can be inferred that a turn in the other direction will lower the light. Whereas many of the prior art designs contemplate internal mechanisms which rotate lens or masks, which then change the characteristics of the cast light beam. As suggested, these designs did accomplish the same results, but the devices themselves became overwrought. Thus, it is desirable to reduce the number of internal mechanisms as the same results may be yielded through other less complicated designs.

From the production standpoint, this brings additional benefits as well as consolidation of previously separate pieces through molding or integrating multiple features into single surfaces enables for less demand as to the number of parts required to be manufactured and lowers the time and steps required to assemble separate parts into a complete light unit.

Furthermore, the present invention is particularly advantageous in the context of a fog headlight. However, its teachings can be applied to other light devices. For example, light devices with a lens in rotation about a vertical axis to produce a mobile part of a light beam, notably a first beam with an oblique or vertical cutoff line. This first beam is intended to be combined with a beam with a horizontal cutoff line.

System, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A fog lamp apparatus comprising:
   A substantially cylindrical housing that comprises at least one bracket, ridges and grooves, at least one inset, at least one pair of sockets on said housing's inside wall, and at least one access hole;
   An outer lens;
   At least one slanted mask that comprises at least one clip and one hook;
   wherein said outer lens is attached to said mask by said clip;
   wherein said hook deposits in said inset of said housing;
   At least one inner lens that comprises at least one hollow cylindrical leg and at least one hook;
   Wherein said hollow cylindrical leg is threaded to receive a screw;
   At least one LED board that comprises a light source;
   At least one heat sink that comprises a pair of symmetrical cylindrical arms, and ridges and grooves that are counterparts of said ridges and grooves of said housing;
   wherein said heat sink further comprises a socket on its outer back wall;
   wherein said LED board is attached to said heat sink;
   wherein said inner lens is attached to said heat sink;
   wherein said cylindrical arms deposit in said pair of sockets of said housing;
   wherein said screw of said inner lens fastens said inner lens to said heat sink;
   At least one PCB;
   At least one adjuster bolt assembly that comprises an adjuster bolt, an O-ring gasket, and a nut;
   wherein said nut further comprises a protruding knob disposed on its outer wall;
   wherein said protruding knob comprises a short cylindrical body and a larger ball head;
   wherein said ball head engages said socket of said heat sink;
   wherein said adjuster bolt is inserted through said access hole of said housing;
   wherein said adjuster bolt's head is accessible from outside said housing.

\* \* \* \* \*